United States Patent Office

2,918,462
Patented Dec. 22, 1959

2,918,462

PROCESS FOR THE PREPARATION OF AMINO-ALDEHYDES

Jean Druey, Riehen, and Georg Huber, Allschwil, Switzerland, assignors to Ciba Pharmaceutical Products Inc., Summit, N.J.

No Drawing. Application January 14, 1957
Serial No. 633,827

Claims priority, application Switzerland January 20, 1956

4 Claims. (Cl. 260—211)

This invention provides a new process for the manufacture of 2-amino-aldehydes and salts thereof, in which the amino group may be unsubstituted or substituted, for example, alkylated, arylated or aralkylated. More particularly, the invention provides a new process for the manufacture of 2-amino-sugars, such as 2-amino-aldoses, preferably 2-amino-aldohexoses, for example, glucosamine or 2-amino-galactose.

2-amino-aldehydes are valuable intermediate products. Thus, 2-amino-aldehydes when subjected to mild oxidation yield α-amino-carboxylic acids. Furthermore, for example, 2-amino-aldoses can be converted by the process described in our copending application Serial No. 633,-825, filed on even date herewith, by treatment with suitable acylating agents into therapeutically valuable N-acylamino-sugars, such as for example N-nicotinoyl-D-glucosamine.

The new process of the invention is based on the unexpected observation that 2-amino-aldehydes and salts thereof can be obtained in good yield by reacting a 1-amino-2-ketone with ammonia or an amine having at least one hydrogen atom, hydrolysing the resulting 1-imino-compound, and if desired, converting the 2-amino-aldehyde so obtained into a salt thereof. As starting materials there are preferably used 1-amino-2-ketones of the sugar series, such as 1-amino-ketoses, preferably 1-amino-ketohexoses, for example, 1-amino-fructose, 1-amino-sorbose or 1-amino-tagatose, the hydroxyl groups of the sugar residue being unsubstituted or one or more of the said groups may be substituted, for example, acylated, e.g. acetylated. These starting materials can be obtained in excellent yield from the corresponding aldoses, for example D-glucose, by means of the Amadori reaction (M. Amadori, Chem. Zbl., 32/II, 33 (1929)). 1-amino-2-ketoses in which the amino group is unsubstituted are obtained by treating an aldose with a bis-arylmethylamine and subsequent hydrogenolytic cleavage of the resulting 1-(N,N-bis-aryl-methylamino)-2-ketoses according to our copending application Serial No. 633,-826, filed on even date herewith. As amines, which may be used instead of liquid or aqueous ammonia, there may be mentioned, N-alkylated, N-arylated or N-aralkylated primary or secondary amines. Primary and secondary amines react with the 1-amino-2-ketones with the formation of the corresponding N-substituted 2-amino-aldehydes. The hydrolization of the imino-compounds may be carried out in the presence of water or an ammonium salt or inorganic or organic acid, such as aqueous mineral acids, e.g. hydrochloric acid.

The reaction may be carried out in the presence or absence of a solvent and/or a condensing agent and/or a catalyst at room temperature or at a raised temperature in an open vessel or a closed vessel. A preferred embodiment of the invention consists in treating 1-amino-1-desoxy-D-fructose acetate with liquid ammonia at ordinary or raised temperature, hydrolyzing the reaction product, e.g. with dilute acid, and isolating the D-glucosamine hydrochloride formed.

Depending on the procedure used the 2-amino-aldehydes are isolated in the form of their bases or salts. From the salts there can be obtained in a manner in itself known the free amine bases. From the bases salts can be obtained by reaction with acids, for example, hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, oxyethane sulfonic acid, benzine or toluene sulfonic acid.

The following examples illustrate the invention:

Example 1

1.2 grams of 1-amino-1-desoxy-D-fructose (isoglucosamine, D-fructosamine) acetate are treated in a $V_2A$-autoclave with 30 cc. of dry liquid ammonia for 6 hours at 95–105° C. under a pressure of about 36–39 atmospheres (gauge pressure). The ammonia is then slowly evaporated, and the residue is dissolved in a small amount of 0.1 N-hydrochloric acid and adsorbed on 30 grams of ion-exchanger (Amberlit JR 120, in the H-form). The adsorbent is rapidly washed with water and then the product is elutriated with 50 cc. of 1 N-hydrochloric acid. The elutriate is evaporated in vacuo, the residue so obtained is dissolved in a small amount of water, and the solution is mixed with alcohol. 0.5 gram of D-glucosamine hydrochloride crystallises. The identity of the free base with glucosamine from the shells of lobsters is determined by paper chromatography and preparation of the phenyl-isocyanate compound (H. Steudel, Z. physiol. Chem., vol. 33, page 223, 1950).

Example 2

4.8 grams of 1-amino-1-desoxy-D-fructose acetate are kept in 40 cc. of anhydrous liquid ammonia for 3 days at room temperature. The ammonia is then evaporated in vacuo whilst carefully excluding moisture. The residue is dissolved in 50 cc. of 1 N-hydrochloric acid and kept for 1 hour on a steam bath. The solution is clarified with animal charcoal and then evaporated in vacuo. The residue is dissolved with a little water and mixed with a great excess of alcohol. 2.3 grams of D-glucosamine hydrochloride crystallise.

What is claimed is:

1. A process for the manufacture of a member selected from the group consisting of 2-amino-aldoses and salts thereof which comprises reacting a 1-amino-2-ketose with a member selected from the group consisting of ammonia and a hydrocarbon amine having at least one hydrogen atom, hydrolyzing the resulting 1-amino compound and isolating a member selected from the group consisting of the corresponding 2-amino-aldose and salts thereof.

2. A process for the manufacture of 2-amino-aldehydes which comprises reacting a 1-amino-ketohexose with a member selected from the group consisting of ammonia and a hydrocarbon amine having at least one hydrogen atom, hydrolyzing the resulting imino compound and isolating a member selected from the group consisting of the corresponding 2-amino-aldohexose and salts thereof.

3. A process for the manufacture of 2-amino-aldehydes which comprises reacting 1-amino-1-desoxy-D-fructose with a member selected from the group consisting of ammonia and a hydrocarbon amine having at least one hydrogen atom, hydrolyzing the resulting imino compound and isolating a member selected from the group consisting of the corresponding 2-amino-2-desoxy-D-glucose and salts thereof.

4. A process for the manufacture of 2-amino-aldehydes which comprises reacting 1-amino-1-desoxy-D-fructose with liquid ammonia, hydrolyzing the resulting 1-imino compound with an aqueous mineral acid and isolating the corresponding salt of D-glucosamine.

References Cited in the file of this patent

UNITED STATES PATENTS 2,808,401 Erickson _____ Oct. 1, 1957
2,815,339 Erickson _____ Dec. 3, 1957
2,884,411 Heyns _____ Apr. 28, 1959

OTHER REFERENCES

Chemical Abstracts, vol. 49 (1955), p. 2333.
Kent et al.: Biochemistry of the Aminosugars, 1955, published by Academic Press Inc. (N.Y.), page 277.